United States Patent [19]
Knuepfer et al.

[11] Patent Number: 5,126,573
[45] Date of Patent: Jun. 30, 1992

[54] OUTPUT LUMINESCENT SCREEN FOR AN X-RAY IMAGE INTENSIFIER HAVING A TERBIUMACTIVATED GADOLINIUM OXYSULFIDE BASE

[75] Inventors: Wolfgang Knuepfer; Monika Mengel, both of Erlangen, Fed. Rep. of Germany

[73] Assignee: Siemens Aktiengesellschaft, Berlin and Munich, Fed. Rep. of Germany

[21] Appl. No.: 657,110

[22] Filed: Feb. 19, 1991

[30] Foreign Application Priority Data

Mar. 9, 1990 [EP] European Pat. Off. ........ 90104518.7

[51] Int. Cl.⁵ .............................. H01J 1/63
[52] U.S. Cl. .............................. 250/486.1; 250/483.1; 250/213 VT
[58] Field of Search ........... 250/483.1, 486.1, 213 VT

[56] References Cited

U.S. PATENT DOCUMENTS

| | | |
|---|---|---|
| T901,019 | 8/1972 | Kasper et al. |
| 3,829,700 | 8/1974 | Buchanan et al. ............... 250/483.1 |
| 3,868,512 | 2/1975 | Prener et al. .................... 250/483.1 |
| 3,974,389 | 8/1976 | Ferri et al. ...................... 250/483.1 |
| 4,054,798 | 10/1977 | Watanabe et al. ............... 250/483.1 |
| 4,507,560 | 3/1985 | Mathers et al. ................. 250/486.1 |
| 4,914,303 | 4/1990 | Kneupfer ........................ 250/483.1 |

FOREIGN PATENT DOCUMENTS

| | | |
|---|---|---|
| 0011909 | 6/1980 | European Pat. Off. |
| 0092240 | 10/1983 | European Pat. Off. |
| 0097377 | 1/1984 | European Pat. Off. |
| 0160856 | 6/1986 | European Pat. Off. |
| 0217338 | 4/1987 | European Pat. Off. |

Primary Examiner—Carolyn E. Fields
Attorney, Agent, or Firm—Hill, Van Santen, Steadman & Simpson

[57] ABSTRACT

An output luminescent screen for an x-ray image intensifier has a carrier on which a phosphor, embedded in a bonding agent, is applied. The phosphor is a terbium-activated gadolinium oxysulfide ($Gd_2O_2S$:Tb)luminophore. The average grain size of the phosphor is between 1.7 μm and 2 μm, with no more than 15%, preferably 10%, of the grains of the phosphor being larger than 3.5 μm, and 85% through 95%, preferably 90%, of the phosphor grains being larger than 1.1 μm. Zinc cadmium sulfide in a proportion up to 80% may be aded to the phosphor.

18 Claims, 1 Drawing Sheet

OUTPUT LUMINESCENT SCREEN FOR AN X-RAY IMAGE INTENSIFIER HAVING A TERBIUMACTIVATED GADOLINIUM OXYSULFIDE BASE

BACKGROUND OF THE INVENTION

1. Field of the Invention

The present invention is directed to an output luminescent screen for an x-ray image intensifier having a carrier on which a phosphor embedded in a bonding agent is applied.

2. Description of the Prior Art

Cathodically luminescing phosphors having a zinc cadmium sulfide base, such as ZnCdS:Hg, are generally used in the output luminescent screens of x-ray image intensifiers. These phosphors are intended to convert the intensity pattern of the photoelectrons emanating from the photocathode into a visible image, the intensity pattern corresponding to the x-ray shadow image. Such phosphors are therefore required to have optimally little intrinsic noise caused by the polycrystalline structure of the screen, and a high image sharpness, in addition to a high light yield per absorbed electron.

SUMMARY OF THE INVENTION

It is an object of the present invention to provide an output luminescent screen for an x-ray image intensifier which emits green light, and wherein the stationary noise after electron irradiation is minimized, and wherein the topical resolution is enhanced.

The above object is achieved in accordance with the principles of the present invention in an output luminescent screen for an x-ray image intensifier wherein terbium-activated gadolinium oxysulfide ($Gd_2O_2S:Tb$) is employed as the phosphor. This phosphor emits green light. An output luminescent screen using this phosphor is distinguished by low graininess (intrinsic noise) and high image sharpness, with a high light yield. The phosphors conventionally employed and the glass substrates employed in the sedimentation exhibit better behavior with respect to terbidity, which is caused by continuous loading with cathode rays.

In a preferred embodiment, the average grain size of the phosphor is between 1.7 $\mu$m and 2.0 $\mu$m, with no more than 15%, preferably 10%, of the grains of the phosphor being larger than 3.5 $\mu$m, and 85% through 95%, preferably 90%, of the grains being larger than 1.1 $\mu$m.

The light emitted by the phosphor is reflected in the direction of the output of the x-ray image intensifier in an embodiment wherein the phosphor layer is covered by a thin aluminum layer. It is preferable that the phosphor be provided with an extremely thin layer of aluminum oxide or silicon oxide ($Al_2O_3$ or $SiO_2$) as a coating. Zinc cadmium sulfide $(Zn,Cd)S:Ag$ can be added to the phosphor, in a proportion amounting up to 80%.

DESCRIPTION OF THE PREFERRED EMBODIMENTS

Figure 1:
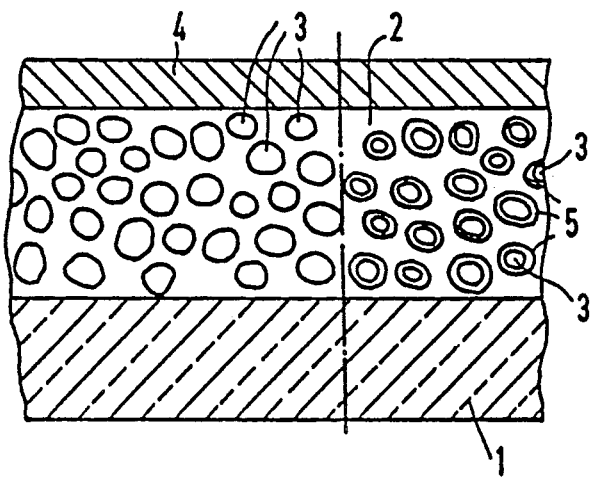
FIG. 1 is an enlarged sectional view for illustrating the structure of an output luminescent screen constructed in accordance with the principles of the present invention.

A carrier 1 for an output luminescent screen of an x-ray image intensifier constructed in accordance with the principles of the present invention is shown enlarged in FIG. 1. The carrier 1 may, for example, consist of a thin glass pane. A phosphor 3, embedded in the bonding agent 2, is applied onto the carrier 1. The layer formed by the bonding agent 2 and the phosphor 3 is covered by a thin aluminum layer 4, which effects a reflection of the emitted light onto the other side of the carrier 1.

As shown at the left side of FIG. 1, the grains of the phosphor 3 may be uncoated, or as shown at the right side of FIG. 1, may be provided with a coating 5 of an extremely thin layer of aluminum oxide or silicon oxide ($Al_2O_3$ or $SiO_2$).

Figure 2:
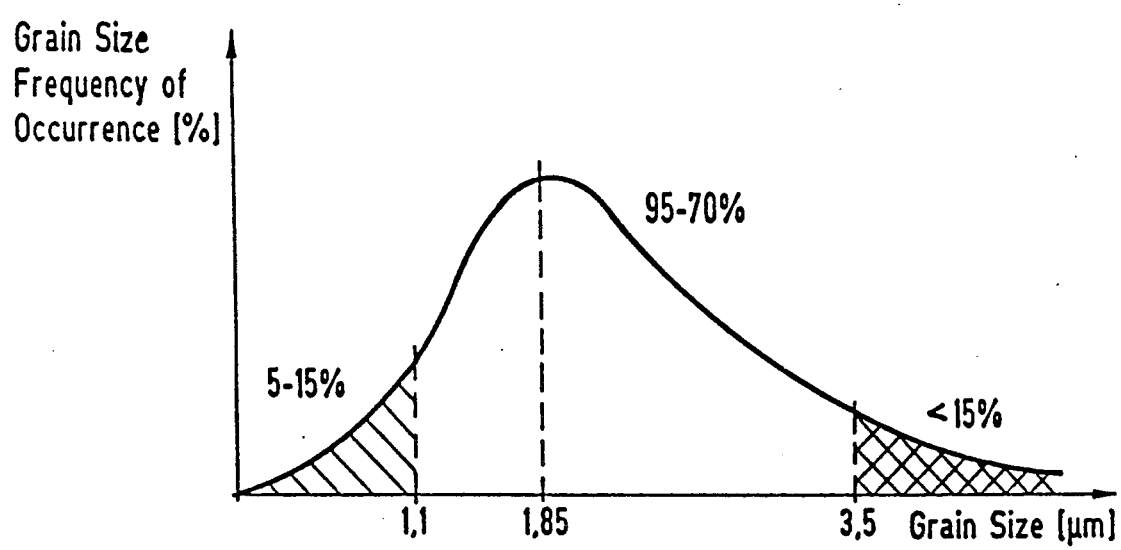
FIG. 2 shows the grain size distribution of the phosphor of the invention.

The grains of the phosphor 3 preferably have the sized distribution shown in FIG. 2. The average grain size of the phosphor 3 should be between 1.7 $\mu$m and 2 $\mu$m, for example, 1.85 $\mu$m. No more than 15%, preferably 10%, of the grains of the phosphor 3 should be larger than 3.5 $\mu$m. Approximately 85% through 95%, preferably 90% of the grains of the phosphor should have a size larger than 1.1 $\mu$m. This means that approximately 5% through 15% will be smaller than 1.1 $\mu$m. Further, 95% through 70% of the grains have a size between 1.1 $\mu$m. As shown in FIG. 2, the frequency of occurrence of the grain sizes of the phosphor 3 will result in a Gaussian distribution curve having a maximum at the average grain size of 1.85 $\mu$m.

The phosphor layer formed by the phosphor 3 and the bonding agent 2 is only a few micrometers thick, the phosphor 3 being uniformly distributed within the bonding agent 2. The phosphor 3 is terbium-activated gadolinium oxysulfide ($Gd_2O_2S:Tb$).

The phosphor layer formed by the bonding agent 2 and the phosphor 3 is applied onto the thin carrier 1 consisting of glass by sedimentation of a bonding agent containing silicic acid, into which the phosphor 3 is introduced. In order to prevent a light feedback to the photocathode, the surface of the phosphor layer is coated with the thin aluminum layer 4, which is light opaque, but is transmissive for the high-energy electrons from the photocathode.

An improvement of the image sharpness and a reduction in the stationary grain noise due to the use of terbium-activated gadolinium oxysulfide as the phosphor, in comparison to a ZnCdS:Ag phosphor (P20) was demonstrated with reference to the following example.

An electron energy of 25 keV was used. The characteristics of "image sharpness," i.e., the modulation transfer function a spatial frequency of 60 lp/mm (MTF 60 lp/mm), and the graininess of the output screens were compared. The graininess is characteristic for characterizing the noise behavior in the phosphor layer. The topical light yield, which was the measured signal along a sampling path, is for this purpose identified and represented by a Fourier series. By summation of the squares of the Fourier coefficients in the frequency range between 1 P/mm and 70 P/mm, and by subsequently taking the square root, the characteristic of graininess is identified. The stationary noise of the output screen becomes more pronounced as the value for the graininess increases.

The characteristics of $Gd_2O_2S:Tb$ output luminescent screen (example) and of the ZnCdS:Ag output luminescent screen (reference) are shown in the following table:

|  | Example | Reference |
| --- | --- | --- |
| Coating | 1.40 mg/cm$^2$ | 1.10 mg/cm$^2$ |
| MTF (60 lp/mm) | 0.40 | 0.25 |
| graininess | 0.50 | 1.20 |

This comparison shows that the output luminescent screen having a terbium-activated gadolinium oxysulfide phosphor has an improved image sharpness and reduced noise. The higher occupation density (i.e., the specific density, of the terbium-activated gadolinium oxysulfide luminescent screen results in this screen having a better retarding capability above 25 keV than the P20 screen having ZnCdS:Ag coated with 1.1 mg/cm$^2$.

This results in the glass employed as the substrate experiencing less terbidity due to electron bombardment, so that output screens having the terbium-activated gadolinium oxysulfide phosphor are more stable over time in terms of the light yield. The luminescent screen coated with ZnCdS:Ag will only have this favorable behavior if it is more thickly coated, for example, with 1.5 mg/cm$^2$. Given a coating of this thickness, however, the MTF curve is significantly degraded.

Although modifications and changes may be suggested by those skilled in the art, it is the intention of the inventors to embody within the patent warranted hereon all changes and modifications as reasonably and properly come within the scope of their contribution to the art.

Zinc cadmium sulfide may be added to the terbium-activated gadolinium oxysulfide phosphor in a proportion up to 80%.

We claim as our invention:

1. An output luminescent screen for an x-ray image intensifier comprising:
   a carrier;
   a terbium-activated gadolinium oxysulfide phosphor embedded in a bonding agent and applied on said carrier; and
   said phosphor having an average grain size between 1.7 $\mu$m and 2 $\mu$m, with no more than 15% of the grains of the phosphor being larger than 3.5 $\mu$m, and 85% through 95% of the grains of the phosphor being larger than 1.1 $\mu$m.

2. An output luminescent screen as claimed in claim 1 wherein 10% of the grains of the phosphor are larger than 3.5 $\mu$m.

3. An output luminescent screen as claimed in claim 1 wherein 90% of the grains of the phosphor are larger than 1.1 $\mu$m.

4. An output luminescent screen as claimed in claim 1 further comprising an aluminum layer covering said phosphor embedded in said bonding agent.

5. An output luminescent screen as claimed in claim 4 wherein each grain of said phosphor is coated with a layer of aluminum oxide.

6. An output luminescent screen as claimed in claim 4 wherein each grain of said phosphor is coated with a layer of silicon oxide.

7. An output luminescent screen as claimed in claim 1 further comprising zinc cadmium sulfide added to said phosphor.

8. An output luminescent screen as claimed in claim 7 wherein the proportion of zinc cadmium sulfide is up to 80%.

9. An output luminescent screen for an x-ray image intensifier comprising:
   a carrier;
   a terbium-activated gadolinium oxysulfide phosphor embedded in a bonding agent and applied on said carrier; and
   said phosphor having an average grain size between 1.7 $\mu$m and 2 $\mu$m with 10% of the grains of the phosphor being larger than 3.5 $\mu$m and 90% of the grains of the phosphor being larger than 1.1 $\mu$m.

10. An output luminescent screen as claimed in claim 9 further comprising an aluminum layer covering said phosphor embedded in said bonding agent.

11. An output luminescent screen as claimed in claim 10 wherein each grain of said phosphor is coated with a layer of aluminum oxide.

12. An output luminescent screen as claimed in claim 10 wherein each grain of said phosphor is coated with a layer of silicon oxide.

13. An output luminescent screen for an x-ray image intensifier comprising:
    a carrier;
    a terbium-activated gadolinium oxysulfide phosphor embedded in a bonding agent and applied on said carrier; and
    zinc cadmium sulfide added to said phosphor.

14. An output luminescent screen as claimed in claim 13 wherein the proportion of zinc cadmium sulfide is up to 80%.

15. An output luminescent screen as claimed in claim 13 wherein said phosphor has an average grain size between 1.7 $\mu$m and 2 $\mu$m with 10% of the grains of the phosphor being larger than 3.5 $\mu$m and 90% of the grains of the phosphor being larger than 1.1 $\mu$m.

16. An output luminescent screen as claimed in claim 13 further comprising an aluminum layer covering said phosphor embedded in said bonding agent.

17. An output luminescent screen as claimed in claim 16 wherein each grain of said phosphor is coated with a layer of aluminum oxide.

18. An output luminescent screen as claimed in claim 16 wherein each grain of said phosphor is coated with a layer of silicon oxide.

* * * * *